United States Patent [19]

Arellano et al.

[11] 4,146,876

[45] Mar. 27, 1979

[54] MATRIX ADDRESSED ELECTROCHROMIC DISPLAY

[75] Inventors: Angel G. Arellano, Saratoga; Peter J. Melz, Morgan Hill; Clayton V. Wilbur, San Jose, all of Calif.

[73] Assignee: International Business Machines Corporation, Armonk, N.Y.

[21] Appl. No.: 811,328

[22] Filed: Jun. 29, 1977

[51] Int. Cl.² ........................................... G06K 15/18
[52] U.S. Cl. .................................. 340/785; 350/333; 350/357; 340/799; 340/800; 340/804
[58] Field of Search ............ 340/324 EC, 324 M, 336; 350/160 R, 333, 357; 58/50 R

[56] References Cited

U.S. PATENT DOCUMENTS

| | | | |
|---|---|---|---|
| 3,938,136 | 2/1976 | Kawakami | 340/324 M |
| 3,987,433 | 10/1976 | Kennedy | 350/160 R |
| 4,041,481 | 8/1977 | Sato | 340/166 EL |

*Primary Examiner*—David L. Trafton
*Attorney, Agent, or Firm*—Fraser and Bogucki

[57] ABSTRACT

A matrix addressed electrochromic display includes first and second spaced apart opposed planar panels, a dielectric spacer peripherally sealing the panels to provide an interior cavity therebetween to define a display region, an electrochromic fluid filling the interior cavity, a plurality of parallel rows and columns of electrodes disposed in the mating surfaces of the first and second panels respectively and a low output impedance electrical refresh circuit coupled to electrically energize the electrodes in a repetitive matrix selection pattern to provide a selected dot matrix display.

25 Claims, 4 Drawing Figures

ROW DRIVER 60

COLUMN DRIVER 62

| VOLTAGE STATE | ROW | COL. WAVEFORM | CROSS POINT VOLTAGE (ROW-COLUMN) |
|---|---|---|---|
| A | SELECTED | WRITE | −.5/1.5V |
| B | SELECTED | CLEAR | .5/.5V |
| C | NON-SELECTED | WRITE | −.5/+.5V |
| D | NON-SELECTED | CLEAR | +.5/−.5V |

MATRIX ADDRESSED ELECTROCHROMIC DISPLAY

BACKGROUND OF THE INVENTION

1. Field of the Invention

This invention relates to electrochromic display panels and more particularly to such panels having a matrix of coincident selection display elements that are periodically refreshed in a matrix selection mode of operation.

2. Description of the Prior Art

It is well known that certain types of materials exhibit an electrochromic characteristic. That is, when coupled between an anode and a cathode they exhibit a change of color at the anode or cathode or both depending upon the electrical energization of the anode relative to the cathode. It is known to provide an electrochromic display in which a plurality of separate segments or display elements are individually energized to provide a desired display characteristic. One such arrangement is disclosed in U.S. Pat. No. 4,008,950 to Chapman et al. However, such arrangements are relatively inconvenient for displays having a large number of display elements because individual control must be maintained over the energization of each display element. Furthermore, it is quite expensive to provide individual cavities for each display element, fill the cavities with an electrochromatic fluid and then seal the cavities.

An arrangement which avoids the necessity of separately filling and sealing individual cavities for each display element is disclosed in U.S. Pat. No. 3,864,589 to Schoot et al. In this arrangement an elongated horizontally extending electrochromic fluid cavity is provided for each of a plurality of electrodes. A plurality of vertically oriented, horizontally spaced individual display element cavities extend in communication with each elongated fluid cavity and orthogonal column electrodes are provided to form a matrix display in which individual electrochromic filled cavities extend between a matrix of row and column electrodes but with each of the individual cavities extending into communication with the elongated horizontally extending fluid cavity so that all individual cavities can be filled by filling a small number of elongated row cavities. This arrangement thus provides both a degree of electrical isolation of the individual display element cavities plus a simplified fluid filling procedure. This arrangement also provides coincident matrix selection of the individual display elements to reduce the complexity of the electrical drive circuit by eliminating the need for a separate individually controlled electrical connection for each display element.

Severe problems have heretofore limited practical applications of matrix addressed electrochromic displays. One is image diffusion and another is cross-talk or the effect which one display element has upon another. The patent to Schoot et al illustrates the two techniques which are most commonly used for minimizing these effects. These are physical isolation of the individual display element cells and use of an electrochromic chemical system in which the colored species deposits out on the electrode. While the use of a horizontally extending pool of electrochromic material as taught by Schoot et al reduces the manufacturing cost, the partial isolation used therein still maintains the manufacturing cost relatively high. The use of solid colored materials limits the choice of the chemical systems which can be used and degrades the speed with which the cells can be colored or erased. Furthermore, in addition to the direct conductivity of the electrochromic fluid between cells, another source of cross-talk is interaction between cells via the electrodes associated with the matrix. An electrically isolated colored display cell in general has a different electrochemical potential difference across it than a clear cell. When these cells are connected together the colored cell tends to drive or color the clear cell. While eliminating the conductivity between cells, the Schoot et al arrangement still suffers from communication between the cells via the electrodes.

SUMMARY OF THE INVENTION

An electrochromic display device in accordance with the invention includes an electrochromic display element matrix panel and drive circuitry coupled to electrically energize conductive electrodes of the panel in a sequential pattern to periodically refresh a display appearing on the panel by periodically applying a voltage in excess of a threshold voltage at electrodes crosspoints. The matrix display panel includes a pair of dielectric plates disposed in closely spaced parallel opposed relationship with each plate of the pair having a conductive pattern formed on a facing surface thereof to form a cross-bar pattern of conductive electrodes within a selected display surface area of the plates to form a plurality of cross-points. Each selected cross-point is color excited by imposition of a voltage in excess of the threshold voltage thereat, the applied voltage resulting from the difference of the individual voltages applied to the row and column electrode which define that cross-point. A peripherally extending dielectric spacer disposed between the two plates defines a sealed interior cavity between the two plates which extends throughout a display region encompassing a plurality of cross-points. An electrochromic redox composition having a threshold voltage characteristic is disposed within the interior cavity to create a selected display pattern characteristic by changing color when energized by a voltage in excess of the threshold voltage.

The electrochromic redox composition is selected to have relatively rapid and efficient coloration capability, reasonably fast color decay or bleaching rate and a relatively high resistivity. The high resistivity combines with a close spacing between the two plates to provide a high resistance coupling between adjacent display elements. Hence, no appreciable cross-talk occurs as a result of conductance through the electrochromic fluid.

While cross-talk through the electrochromic composition is controlled by high resistance isolation of adjacent display elements, cross-talk through the matrix electrodes is eliminated by driving the electrodes at all times with low impedance drivers and by providing low resistance electrodes to connect the drivers to the individual display elements so that the electrode voltages at the display elements are controlled by the driver circuitry and substantially independent of the chrominance state of individual elements of the display.

When the panel is driven by low impedance circuitry, the coloration decays spontaneously at each display element when the cross-point is not being held at a potential difference exceeding the threshold potential. The display is therefore driven in a periodic refreshed mode in which desired display elements are periodically refreshed to maintain color and display elements which are not refreshed rapidly discolor.

Even though the colored species may be soluble and thus free to diffuse throughout the display area, the spontaneous decay characteristic limits the diffusion to a distance comparable to the thickness of the cell. Since the cell can be thin compared to the width of a display element, there is no loss of image resolution due to diffusion.

The spontaneous decay rate of the chrominance depends on the voltage across the cell when the cell is not selected or driven above threshold. This voltage will vary in general with the information being displayed and cause chrominance variations. By using a special column and row drive technique in which the time average voltages appearing at display elements in unselected rows is always zero, this variation is eliminated.

BRIEF DESCRIPTION OF THE DRAWINGS

A better understanding of the invention may be had from a consideration of the following Detailed Description taken in conjunction with the accompanying drawings in which.

DETAILED DESCRIPTION

Figure 1:
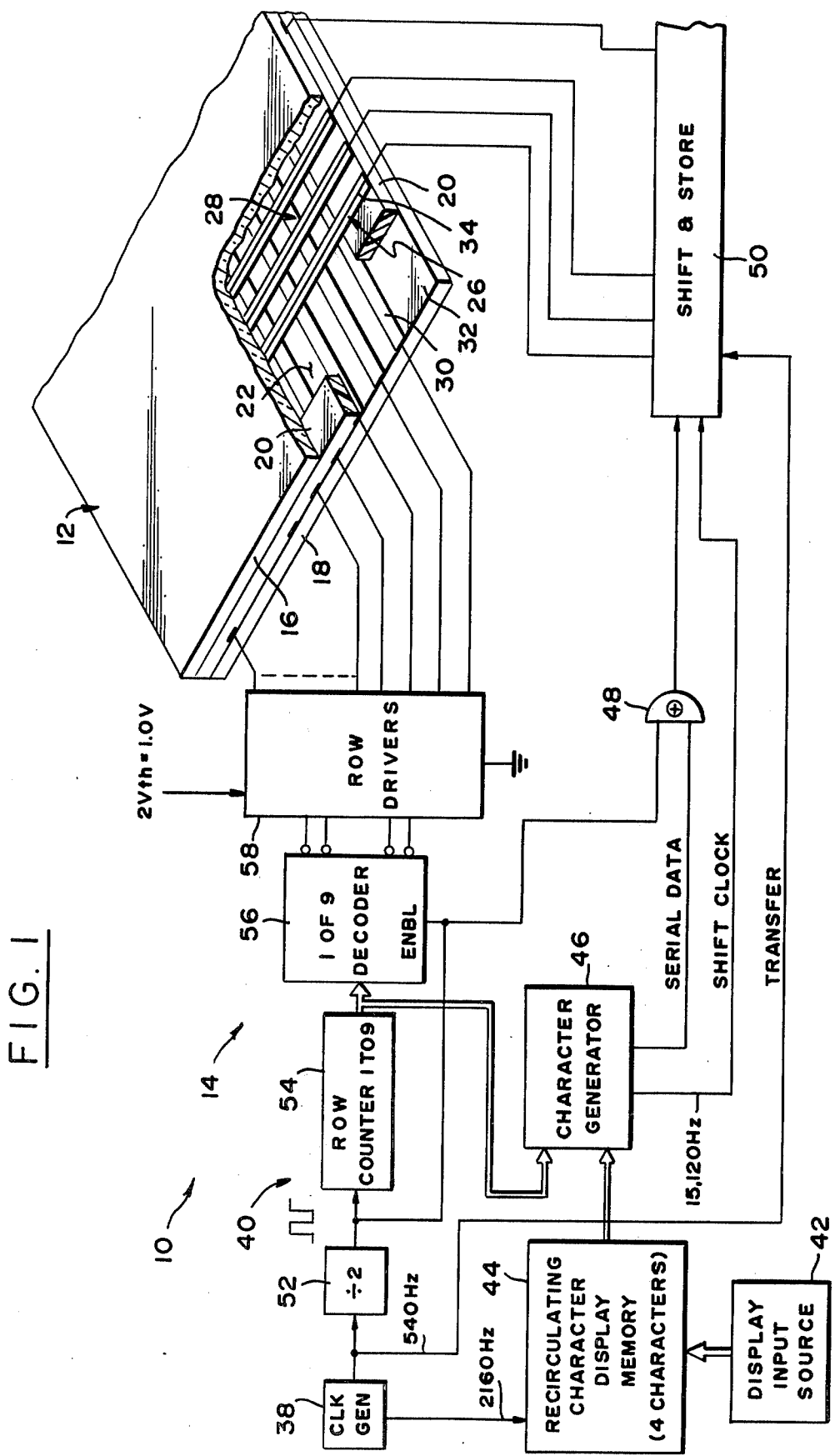
FIG. 1 is a partly schematic and partly broken away perspective representation of a display device in accordance with the invention.

Referring now to FIG. 1, an electrochromic display device 10 in accordance with the invention includes a display panel 12 and drive circuitry 14 coupled to drive the panel 12 in a matrix refresh mode of operation. The display panel 12 includes two clear glass plates 16, 18 disposed in closely spaced parallel opposed relationship and separated by a peripherally extending mylar spacer 20 which sealingly engages the glass plates 16, 18 about their peripheries to maintain them in a desired spaced relationship and provide an interior cavity 22 between the two spaced apart plates 16, 18. The cavity 22 is filled with an electrochromic fluid which has a threshold voltage characteristic for electrocoloration and preferably has a relatively high resistivity.

A plurality of vertically extending or column electrodes 26 are disposed in parallel spaced relationship on the facing interior surface of upper clear glass plate 16 and a plurality of row electrodes 30 are disposed on a facing interior surface 32 of glass plate 18, which may or may not be transparent. The electrodes 26 and 30 extend through the display region and define a matrix of display elements, each display element being disposed at an unique intersection of a combination of one column electrode 26 and row electrode 30. While the number and relative spacing of the column and row electrodes 26, 30 may depend upon a particular application for which the display panel 12 is designed, in the present instance the panel is suitable for the display of four data characters each represented by a display element array of 7 × 9 cross-points. There are thus nine row electrodes 30 extending horizontally through the display region of panel 12 and 28 column electrodes 26 extending vertically through the display region of the panel 12. The size and shape of each dispaly element is determined by the size and shape of the coextensive crossover of a row and column electrode. The electrodes 26, 30 are thus made relatively wide with respect to the spacing between adjacent electrodes.

In the present example each column electrode 26 has a width of 20 mils and a spacing of 3 mils is provided between adjacent column electrodes for a single character with a spacing of 46 mils being provided between the adjacent columns for adjacent characters. The row electrodes 30 have a width of 25 mils with a spacing of 3 mils between adjacent electrodes. This results in a character height of 0.249 inch and a character width of 0.158 inch. The column electrodes 26 are formed by selectively etching a Nesa coating on the interior surface 28 of glass plate 16 using conventional etching techniques. In addition, a fine gold conductor 34 is formed along each column electrode 26 in electrical communication therewith. The high conductivity gold electrode 34 affords each of the electrodes 26 a low resistance to permit cross-talk between display elements to be essentially eliminated by allowing the voltage at all locations along each electrode 26 to be controlled by the electronic circuitry and be substantially independent of the information being displayed. At the same time, the gold electrode 34 is sufficiently narrow that it is almost invisible and has very little effect on the viewing of displayed information.

The row electrodes 30 on the surface 32 of glass plate 18 could be constructed in the same way as the column electrodes 26, but because they couple more display elements and thus carry more current and because they need not be optically clear, it is preferable that the row electrodes 30 be formed of a highly conductive material which is inert to the electrochromatic fluid such as gold or platinum. An underlayer of chrome is used to promote adhesion of gold to the glass surface 32. The specular reflection of the gold electrodes is preferably reduced by light sandblasting.

A number of competing factors are involved in determining the optimum spacing between the glass plates 16, 18 and the chemical composition of the electrochromic fluid. In general, it is desirable that the display elements show a high rate of increase of coloration at the energization voltage and a decay rate response time constant which is relatively long for purposes of best coloration but short enough that the information content of the display may be readily changed.

The primary effect of spacing between glass plates is on the response time of the display. As a cross point is driven above threshold, colored species are created at the electrode and begin to diffuse into the cell. This process continues until an equilibrium is reached where the rate at which colored species are produced equals the rate at which they disappear, either through bulk processes in the volume of the electrochromic liquid or by decoloration at an electrode. The time required to reach this equilibrium or the display response time is proportional to the diffusion time of a molecule across the cell thickness. Thus for fast response the spacing should be small. It is further desirable to keep the spacing small to reduce "blooming" of the image from the electrode, since the distance a colored molecule will diffuse away from the electrode before it becomes decolored by bulk processes may also be proportional to the spacing between plates. On the other hand the amount of colored material available under equilibrium conditions to produce a change in chrominance is proportional to the spacing between plates, hence to achieve a high degree of coloration larger spacing is preferred. If the spacing is reduced the rate of coloration must be increased to achieve the same level of coloration or chrominance. Further, decreasing the spacing between glass plates 16, 18 increases the current density by decreasing the resistance between the opposing column and row electrodes 26, 30 and simultaneously increases the resistance presented by the electrochromic fluid to spreading of the electrical energization of a cell to surrounding areas. Increasing the conductivity of electrochromic fluid improves the rate of increase of coloration, but also reduces the resistance to spreading of cell energization. In general, it has been found that the spacing between the glass plates 16, 18 should be between 0.0005 and 0.005 inch with a spacing of approximately 0.0015 inch being optimum. The decay time constant of the electrochromic fluid is preferably between 0.1 and 0.4 second and the resistivity of the electrochromic fluid is preferable between 5000 and 50 ohm-centimeters.

In general, the electrochromic fluid disposed in the cavity 22 between the plates 16, 18 should consist of a redox couple which will react reversibly at the anode, a second redox couple which will react reversibly at the cathode, a salt which is electrochemically inert and provides the required electrical conductivity to the formulation, and a solvent for dissolving the other three components. One or both of the redox couples should provide a change in coloration upon oxidation or reduction to facilitate the display of desired information upon electrical energization. For energization in a coincident matrix address mode, the electrochromic fluid should also have a threshold voltage characteristic.

It should be realized that the electrochromic solution is in physical contact with a given row and column electrode for the entire length of these electrodes in the active display area of the panel, yet when a potential difference is applied across the electrodes by the drive circuitry to properly display the desired information, the current flow which produces the coloration should be localized to the area where the two electrodes overlap. This can be accomplished if the lateral resistance of the electrochromic solution is high compared to the resistance along an electrode. The current will thus be confined to the electrodes except when it must pass through the solution to cross between electrodes where they are most nearly in contact. To obtain the proper high resistance ratio of the solution to the electrodes it is desirable to use non-aqueous solvents, since salt solutions of these solvents in general are not as conductive as aqueous salt solutions. In general, electrochromic fluid formulations of the type described in U.S. Pat. No. 3,451,741 are operative. It has been found that solutions which use pyrazoline material as the color forming redox couple are particularly effective and some of these materials show an exceptionally high electrochromic efficiency. Such formulations are described in U.S. patent application Ser. No. 754,303 filed Dec. 27, 1976, for "High Efficiency Electrochromic Display Device" by M.D. Shattuck et al and assigned to the assignee of this patent application [SA 975070].

One electrochromic fluid formulation which has been found to be particularly useful is 0.09 mole of 1-p-methoxyphenyl-3-p-diethylamino styryl-5-diethylamino phenyl-$\Delta^2$-pyrazoline, 0.2 mole phenyl-p-benzoquinone, and 0.4 mole tetrabutylammonium fluoroborate in methylethyl ketone. A second formulation which has been found to be particularly suitable is 0.2 mole 1-p-methoxyphenyl-3-p-dipropylamino styrlyl-5-dipropylamino phenyl-$\Delta^2$-pyrazoline, 0.4 mole phenyl-p-benzoquinone, and 0.8 mole tetrabutylammonium fluoroborate in methylethyl ketone.

Because the column and row electrodes 26, 30 are driven by low impedance sources, the individual energized electrochromic cells discharge through the electrodes. The cell decay is thus dependent upon the voltage across the electrodes and there is a tendency for the cells along a given column electrode for which a large number of the cells are energized for a particular display to experience a much greater average voltage potential and thus decay much more slowly than for example a cell along a column electrode for which only a single cell is energized for a given display. As a result, the cells along a column electrode having multiple energized cells would present an apparent increased chrominance compared to a cell energized along a column electrode for which only one cell is energized. For example, the uprights of an H pattern would display an increased chrominance relative to the crossbar.

The drive circuitry 14 eliminates this pattern sensitive chrominance intensity problem by driving the electrodes in a special mode such that the time average voltage applied to all display elements is identical. The display is refreshed at a rate of 30 refreshes per second which is sufficiently rapid that the human eye integrates the light emenating from the display and does not see the results of individual refreshes.

The drive circuitry 14 is shown in somewhat simplified form in FIG. 1 and includes a clock generator 38 and a divide-by-two counter 52 which generate a 540 hertz clock signal and a 270 hertz clock signal respectively, row select circuitry 54, 56 and 58 which sequentially select the row electrodes for energization, in response to the 270 hertz clock signal, a display input source 42 which may be a microprocessor or any other source of characters to be displayed, a recirculating character display memory 44 which stores the characters which are to be displayed and sequentially presents them to a character generator 46, an Exclusive-OR gate 48 and a 28 bit shift and store circuit 50. The row select circuitry 40 includes a divide-by-two counter 52 which is responsive to the 540 hertz clock pulse, a divide-by-nine row counter 54 which is responsive to the 270 hertz output of divide-by-two counter 52, a one of nine decoder 56 which decodes the output of row counter 54, and row drivers 58 which drive the individual row electrodes of the display panel 12 in response to the outputs from decoder 56 and divide-by-two counter 52.

Because each row electrode communicates with 28 individual display elements or cells, each of which may produce a current load of 1 milliamp, the maximum current load is 28 milliamps. A larger 16 character display may produce a current load as high as 112 milliamps for the row driver 60.

Figure 2:
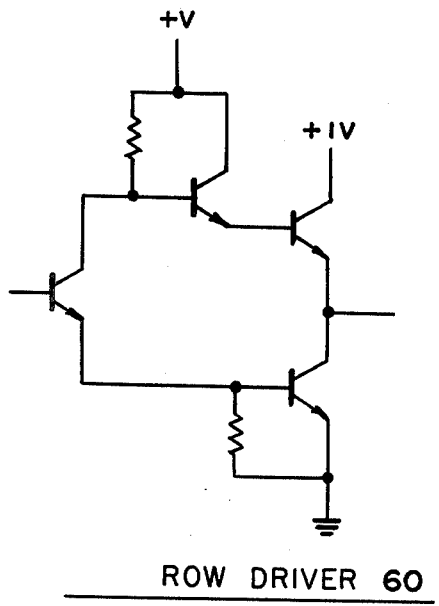
FIG. 2 is a schematic representation of the output stage of a low impedance row driver circuit in accordance with the invention.

A totem pole inverter circuit 60 shown in FIG. 2 is capable of handling this current load and providing the required low impedance output which is preferably less than 300 ohms to each of the row electrodes. The row drivers 58 thus might include nine of the inverter circuits 60 each being responsive to a different output from the decoder 56. Decoder 56 is enabled during only a second half of each row period by the 50% duty cycle signal from the divide by two counter 52. Thus during the first half of each row period all row electrodes 26 are coupled to ground and during a second half of each row period a selected one of the nine row electrodes is driven at a voltage of +1 volt while the other eight remain at ground potential.

The display input device 42 provides data information to the recirculating character display memory 44 which sequentially outputs the four display characters at a rate of 2160 characters per second. At this speed, all four display characters are output for each half of a row update period. Character generator 46 responds to the data characters indicated by memory 44 and to the row update information from row counter 54 to provide that pattern refresh data at a serial data rate of 15,120 display elements per second. This data rate enables the refresh dot display data for a given row position to be provided to shift and store circuit 50 during each half of a row refresh time period. Exclusive-OR gate 48 responds to the output of the divide-by-two counter 52 and to the serial data output of character generator 46 to pass to shift and store circuit 50 the required dot pattern update data during the first half of a row period and the complement of the dot pattern update data during the second half of the row period.

Figure 3:
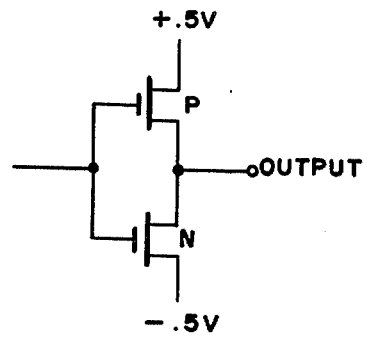
FIG. 3 is a schematic representation of the output stage of a low impedance column driver circuit in accordance with the invention.

Shift and store circuit 50 is a combination 28 bit serial in parallel out shift register and 28 latches which receive and latch the parallel outputs of the shift register. It may be similar to a series combination of four RCA C-Mos CD 4094 8 bit shift and store integrated circuits. The shift and store circuit requires output drivers such as the C-Mos output driver 62 shown in FIG. 3 to maintain the column ouputs at either +0.5 volts or −0.5 volts. Each output of driver 62 preferably has an impedance less than 300 ohms. During the first half of a row refresh period, the uncomplemented dot display refresh pattern for a given row is shifted into shift and store circuit 50. At the end of the first half of the row refresh period the dot pattern information is loaded into the output latches to drive the column electrodes while the decoder 56 is enabled to cause a selected row electrode to be energized to provide a coincident selection dot display element energization for one row of display cells in the display panel 12. Also during the second half of the row refresh period the output of divide-by-two counter 52 drives Exclusive-OR gate 48 with a logid one input to cause the complement of the dot refresh pattern data for the next row refresh period to be loaded into shift and store circuit 50.

At the end of the second half of the row refresh period, the complement refresh dot pattern data for the next period is loaded into the latches of shift and store circuit 50 to drive the column electrodes with complement refresh data during the first half of the next row refresh period while uncomplemented dot refresh data corresponding thereto is serially shifted into shift and store circuit 50. Thus, during the first half of each row refresh period the shift and store circuit drives the column electrodes with the complement of the dot refresh pattern data for the row refresh operation. However, because the row decoder 56 is no enabled during this first half of a row refresh period, the complement data does not exceed the threshold voltage at any column position in the display panel 12 and cannot cause the energization of a display cell. Nevertheless, each column electrode is necessarily driven alternately with +V threshold for ½ row period and −V threshold for another ½ row period to provide a time average of 0 volts during the non-select time. Therefore, the discharge rate and hence apparent coloration of the cell is independent of the information being displayed.

Figure 4:
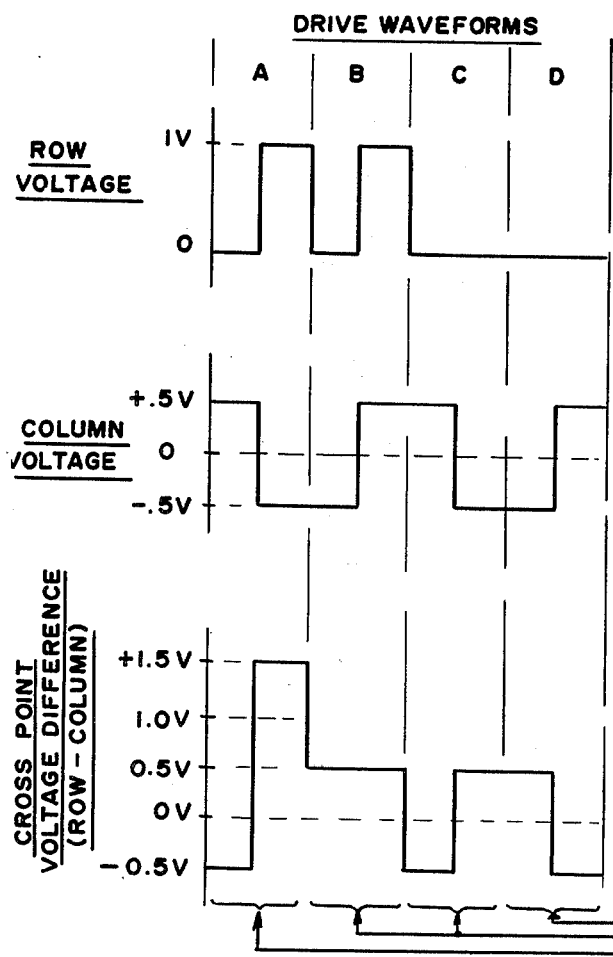
FIG. 4 is a graphical representation of the different waveforms that exist in the display device in accordance with the invention.

A further understanding of the refreshing of a cell may be had from reference to FIG. 4 which shows the row voltage column voltage, and total voltage at a given cell for the four possible different voltage states corresponding to the row selected or non-selected and the column write or clear. Row energization period state A represents a condition corresponding to full selection with the row selected and the write waveform of the column. During the first half of state A, a given selected cell receives a total voltage thereacross of 1.5 volts. This is three times the threshold voltage of 0.5 volts and causes the cell to rapidly recharge and display a chrominance differential from noncharged display cells. During the first half of state A the selected cell experiences a voltage thereacross of −0.5 volts.

State B represents a partial selection condition in which a given cell is row selected but is not column selected. During the second half of state B the given cell experiences a total voltage of +0.5 volts. This is equal to the voltage threshold of the cell and is insufficient to charge the cell. The cell thus remains in its uncharged nonchrominant state. During the first half of state B the electrodes are energized with −0.5 volts on the column electrodes and 0 volts on the row electrode to provide a total voltage across the cell of +0.5 volts. Thus, even though the select waveform is applied to the row electrode, the cross point voltage does not exceed the threshold at any time during the period and no coloration occurs.

In a similar manner the cross point voltages corresponding to time periods C, row non-selected and column write, and D, row non-selected and column clear, can be obtained. Since the row non-selected waveform is always zero the cross point voltage is simply the inverse of the column waveform and never exceeds the threshold value of 0.5 volts.

During eight out of nine of the row refresh periods a cell will remain unselected by the row electrode with either the write wave form on the column electrode as shown for state C or with the clear wave form on the column electrode as shown for state D. Regardless of which column selection condition exists, the given cell experiences either + or −0.5 volts during the first half of the row refresh period and the complement − or +0.5 volts during the second half of the row refresh period. The cell thus experiences a time average 0 volts during eight out of nine of the row refresh periods without regard to the data information being displayed. As long as the non-selected row wave form is zero, this condition only depends on using symmetrical column waveforms and is independent of the ratio of the row to column voltages. During the non-selected row refresh periods the display decay rate and hence chrominance for energized cells is thus independent of the particular display pattern and the chrominance remains uniform and constant for all energized cells.

While there has been shown and described above a particular arrangement of an electrochromic dot matrix refresh display in accordance with the invention for the purpose of enabling a person or ordinary skill in the art to make and use the invention, it will be appreciated that the invention is not limited thereto. Accordingly, any modifications, variations or equivalent arrangements within the scope of the attached claims should be considered to be within the scope of the invention.

What is claimed is:

1. An electrochromic display device comprising:

a panel including a pair of dielectric plates disposed in closely spaced parallel opposed relationship, each plate of the pair having a conductive pattern formed on a facing surface thereof to form a cross bar pattern of conductive electrodes within a selected surface area of the plates which includes a plurality of cross points, each cross point being selectable for imposition of a given voltage difference thereat by generation of a voltage on one electrode on each plate which passes through the cross point, the panel further including an electrochromic redox composition disposed within the space between the plates within the selected surface area without dielectric isolation between portions of the electrochromic redox composition at different cross points; and drive circuitry coupled to electrically energize the conductive electrodes in a sequential pattern to periodically refresh a display appearing on the panel by periodically applying the given voltage difference at cross points selected to provide a desired display pattern, the given voltage difference being thereby substantially maintained at the cross points so long as they are to provide the desired display pattern.

2. The display device according to claim 1 above, wherein the input impedance of the drive circuitry is sufficiently low relative to the resistance through the electrochromic redox composition at the various cross points such that there is no substantial discharge from the electrochromic redox composition at a cross point to which the given voltage difference is applied into adjacent areas of the electrochromic redox composition.

3. The display device according to claim 1 above, wherein the space between the pair of plates is between 0.0005 inch and 0.005 inch.

4. The display device according to claim 3 above, wherein the space between the pair of plates is 0.0015 inch.

5. The display device according to claim 1 above, wherein the electrochromic redox composition has a threshold voltage conductance characteristic.

6. The display device according to claim 1 above, wherein the amplitude of the voltage on a first electrode passing through the cross point is at or below the threshold and the amplitude of the voltage on a second electrode passing through the cross point is at least twice the amplitude of the first voltage.

7. The display device according to claim 6 above, wherein the first electrode is a column electrode and the second electrode is a row electrode.

8. The display device according to claim 1 in which the electrochromic redox material comprises a first redox couple which reacts reversibly at an anode, a second redox couple which reacts reversibly at a cathode, a salt which is electrochemically inert and a solvent having the first and second redox couples and the salt dissolved therein.

9. The display device according to claim 1 above, wherein the solvent is a nonaqueous solvent.

10. The display device according to claim 1 above, wherein the resistivity of the electrochromic redox composition is between 5000 and 50 ohm-centimeters.

11. The display device according to claim 8 above, wherein one of the redox couples is a pyrazoline material.

12. The display device according to claim 8 above, wherein the electrochromic redox composition is methyl ethyl ketone solvent containing 0.09 mole 1-p-methoxyphenyl-3-p diethylamino styryl-5-diethylamino phenyl-$\Delta^2$-pyrazoline, 0.2 mole phenyl-p-benzoquinone, and 0.4 mole tetrabutyl ammonium fluoroborate.

13. The display device according to claim 8 above, wherein the electrochromic redox composition is methyl ethyl ketone solvent containing 0.2 mole 1-p-methoxyphenyl-3-p-dipropylamino styrl-5-dipropylamino phenyl-$\Delta^2$-pyrazoline, 0.4 mole phenyl-p-benzoquinone, and 0.8 mole tetrabutyl ammonium fluoroborate.

14. The display device according to claim 1, wherein the response time of the panel during which the color characteristic of the display at a selected cross point decays 50% after refresh is between 0.1 and 0.4 second.

15. The display device according to claim 1, wherein the electrochromic redox solution has a high rate of increase in coloration upon selection.

16. The display device according to claim 1 above, wherein drive circuitry is coupled to the electrodes as a low impedance source to control the voltage thereof at all times during operation of the display device.

17. An electrochromic display comprising:
an electrochromic liquid having a known threshold voltage and a known decay time, spaced apart row and column conductor sets addressably refreshing the electrochromic liquid by applying differing voltages to individual conductors in the spaced apart row and column conductor sets; refresh means for pulse energizing selected conductors in the row and column conductor sets in cycles whose total period is less than the decay time of the liquid, the applied voltage exceeding and being maintained at a value exceeding the threshold of the liquid at intersections of the conductors at which the liquid is to be colored.

18. The display according to claim 17 above, wherein the refresh means maintains an equal time average voltage across all intersection of the conductors during a refresh period irrespective of the information being displayed.

19. A matrix character display device comprising:
a pair of insulative panels in parallel spaced apart relationship, one of said panels being transparent;
first and second sets of orthogonally disposed conductors, each set being on a different panel and the set on the transparent panel being at least substantially transparent, the sets of conductors defining the rows and columns of a matrix:
electrochromic means filling the space between said panels in the region of the matrix;
means coupled to address the conductor sets with signals establishing electrical potential differences between selected conductors in the rows and columns to color the electrochromic material in the intersectional volume at a chosen row and column conductor intersection, said address means further comprising means to repeatedly apply said electrical potentials in cyclic sequences having total periods less than the decay time of the electrochromic material, each cycle including in least one reversal of the signal polarity on at least one conductor, such that diffusion of the reduction process at the intersection is limited to the volume coextensive with both conductors.

20. A matrix character display device comprising:

a pair of insulative panels in parallel spaced apart relationship, one of said panels being transparent;

first and second sets of orthogonally disposed conductors, each set being on a different panel and the set on the transparent panel being at least substantially transparent, the sets of conductors defining the rows and columns of a matrix;

electrochromic means filling the space between said panels in the region of the matrix;

means coupled to address the conductor sets with signals establishing electrical potential differences between selected conductors in the rows and columns to color the electrochromic material in the intersectional volume at a chosen row and column conductor intersection, said address means further comprising means to repeatedly apply said electrical potentials in cyclic sequences having total periods less than the decay time of the electrochromic material, each cycle including at least one reversal of the signal polarity on at least one conductor, such that the time average voltage at a given cross point is independent of the state of coloration of the remaining cross points on the same column.

21. The display device according to claim 20 above, wherein the addressing means is always in a state of low output impedance.

22. The display device according to claim 21 above, wherein the spacing between the panels is much less than the width of the conductors of the first and second sets.

23. A variable reflectance cell display device comprising:

an electrochromic liquid that is energizable by a voltage, comprising:

a pair of planar non-conductive substrates spaced apart by a spacing in the range of 0.5 to 5 mils and at least one of said substrates being transparent, the electrochromic liquid being contained between the substrates;

a transparent conductor disposed on the inner face of the transparent substrate and having a width in the range of 5 to 50 mils;

a narrow high conductivity element disposed on the transparent conductor;

and a diffusely reflective conductor disposed on the inner face of the second substrate and having a width in the range of 5 to 50 mils.

24. An electrochromic display device comprising:

(a) a front and back plate, with the inner surfaces of said plates equipped with electrode segment strips such that the superposition of the strips on the front and back panels form a matrix of cross-points;

(b) a color-forming electrochromic redox composition contained between said plates and in contact with the electrodes, therein, said composition having high impedance parallel to the electrodes; and (c) drive circuitry for applying and maintaining selected potential differences across the electrode strips in a matrix addressed manner to effect the coloration of selected cross-points, said circuitry maintaining sufficiently low output impedance at all times that the potentials of the electrode strips are controlled by the drive circuitry rather than by the redox state of the electrochromic composition present at the electrode cross-points.

25. An electrochromic display device comprising:

a first plate having a plurality of closely spaced row conductors formed on one surface thereof, the width of the row conductors defining a first dimension of dots in a dot display matrix;

a second plate having a plurality of closely spaced column conductors formed on one surface thereof, the one surface of the second plate being disposed in facing, parallel, closely spaced relationship to the one surface of the first plate with the column conductors of the second plate crossing the row conductors of the first plate with each crossover of a row conductor by a column conductor forming a dot in a dot display matrix, the width of the column conductors defining a second dimension of dots in the dot display matrix; and an electrochromic material disposed between the row and column conductors in electrical communication therewith; and a refresh driver connected to provide coincident selection refresh of selected individual dots in the dot matrix to maintain a desired voltage at the selected individual dots to display a desired information pattern, each refresh of a selected individual dot consisting of the application of different voltages to the row and column conductors the crossover of which forms the dot so as to provide a potential difference of desired polarity across the electrochromic material, the refresh driver having outputs that drive the row and column conductors with a low impedance at all times and which is substantially lower than the impedance through the electrochromic material at each of the dots.

* * * * *

UNITED STATES PATENT AND TRADEMARK OFFICE
CERTIFICATE OF CORRECTION

PATENT NO. : 4,146,876

DATED : March 27, 1979

INVENTOR(S) : Angel G. Arellano et al

It is certified that error appears in the above-identified patent and that said Letters Patent are hereby corrected as shown below:

Column 10, line 41, "intersection" should read --intersections--; line 53, after "matrix;" insert --and--. Column 11, line 9, after "matrix;" insert --and--; line 11, after "establishing" and before "electrical", insert --and maintaining--; line 34, after "voltage," strike "comprising:" and insert --maintained thereat;--. Column 12, line 32, after "matrix;" strike "and".

Signed and Sealed this

Twenty-sixth Day of June 1979

[SEAL]

Attest:

RUTH C. MASON
Attesting Officer

DONALD W. BANNER
Commissioner of Patents and Trademarks